Aug. 25, 1925.

J. E. PERREL

PIPE GRAB

Filed April 9, 1925

1,551,214

Inventor
J. E. Perrel

By C.A.Snow&Co
Attorneys

Patented Aug. 25, 1925.

1,551,214

UNITED STATES PATENT OFFICE.

JOHN E. PERREL, OF BIG SPRINGS, NEBRASKA.

PIPE GRAB.

Application filed April 9, 1925. Serial No. 31,889.

*To all whom it may concern:*

Be it known that I, JOHN E. PERREL, a citizen of the United States, residing at Big Springs, in the county of Deuel and State of Nebraska, have invented a new and useful Pipe Grab, of which the following is a specification.

This invention aims to provide a simple device adapted to be used on well pipes and the like, which are to be raised and lowered, the construction of the device being such that it will retain a secure hold on the pipe. Another object of the invention is so to construct the article that the same may be manipulated by one person standing on the ground, thereby rendering it unnecessary for one operator to be up on the derrick, and for another operator to be on the ground.

It is within the province of the disclosure to improve generally and to enhance the utility of devices of that sort to which the invention appertains.

Although a preferred form of the invention has been shown in the drawings, it will be understood that a mechanic, working within the scope of what is claimed, may make such changes as his skill may suggest, without departing from the spirit of the invention.

In the accompanying drawings:—

Figure 1:
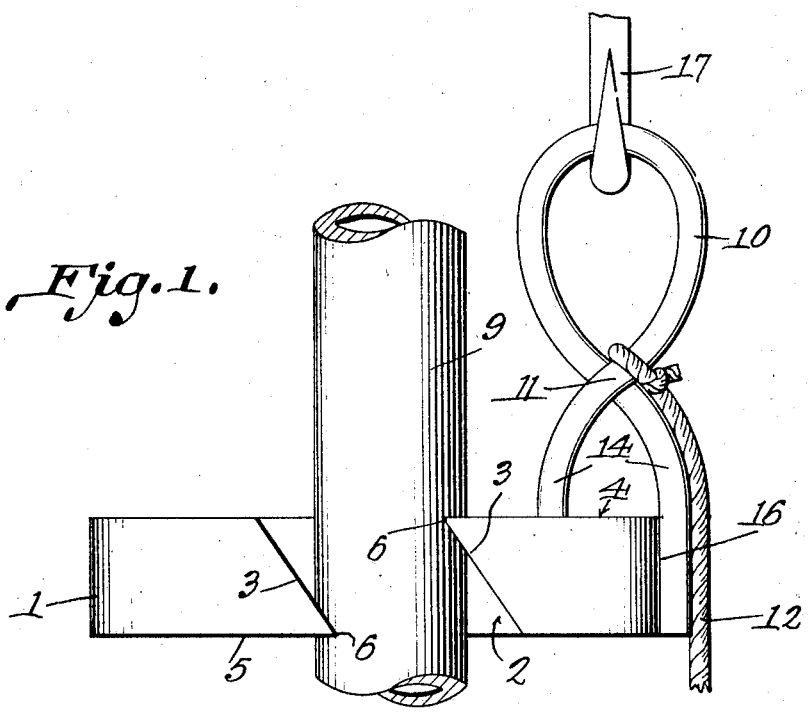
Figure 1 shows in side elevation, a device constructed in accordance with the invention.
Figure 2:
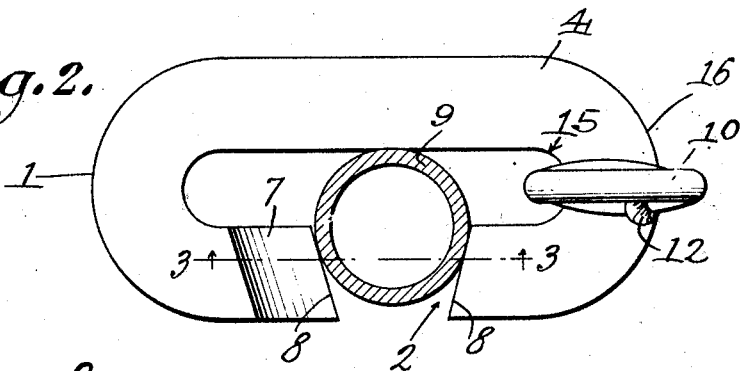
Figure 2 is a top plan.
Figure 3:
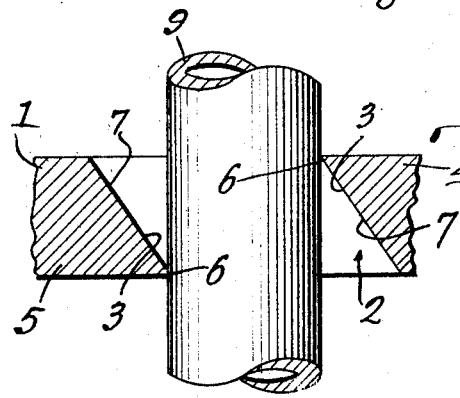
Figure 3 is a section taken about on the line 3—3 of Figure 2.

The pipe-grab forming the subject matter of this application preferably is made of steel and includes a loop-shaped body 1 provided in one side with a slot 2, the walls of which are acutely inclined, as shown at 3, respectively, with respect to opposite surfaces 4 and 5 of the body, thereby to define diagonally opposite gripping edges 6, the walls converging outwardly, as at 7, thereby to cause the gripping edges 6 to converge outwardly, as at 8, and retain against outward movement, the pipe 9 which is to be handled, the pipe being engaged by the gripping edges 6, in a way which is understood readily by those skilled in the art.

A suspension means is assembled with one end of the body 1 and is disposed about at right angles to the body, the suspension means being rigid, and comprising an eye 10, the constituent material of which is crossed upon itself to form a seat 11 for a pull-back line 12, and to form arms 14 secured, respectively, to the inner surface 15 of the body and to the outer surface 16 thereof. The eye 10 is adapted for the reception of a hoisting means 17, such as a hook.

When the body 1 is raised by the suspension means 17, the pipe 9 will be raised also. Through the instrumentality of the line 12, the device may be slid downwardly along the pipe 9 and be manipulated in such a way that it will be unnecessary for a person to ascend the well-derrick during the raising and lowering of a string of pipe.

Having thus described the invention, what is claimed is:—

1. A pipe-grab comprising a body provided with a slot the walls of which are acutely inclined, respectively, with relation to opposite surfaces of the body, thereby to define diagonally opposite gripping edges, the walls converging outwardly, thereby to cause the gripping edges to converge outwardly and retain against outward movement the pipe to be handled; and suspension means assembled with the body.

2. A pipe-grab constructed as set forth in claim 1, and further characterized by the fact that the suspension means is rigidly mounted at one end of the body and is disposed approximately at right angles to the body, the suspension means having spaced places of attachment for a hoisting means and for a pull-back line.

3. A pipe-grab comprising a loop-shaped body provided in one side with a slot defining diagonally opposite gripping edges, and a suspension means comprising an eye the constituent material of which is crossed upon itself to form a seat for a pull-back line, and to form arms secured, respectively, to the inner and outer surfaces of the body, the eye being adapted for the reception of a hoisting means.

In testimony that I claim the foregoing as my own, I have hereto affixed my signature.

JOHN E. PERREL.